United States Patent [19]

Jones et al.

[11] Patent Number: 4,541,946

[45] Date of Patent: Sep. 17, 1985

[54] CORROSION INHIBITOR FOR AMINE GAS SWEETENING SYSTEMS

[75] Inventors: Loyd W. Jones; John D. Alkire, both of Tulsa, Okla.

[73] Assignee: Standard Oil Company, Chicago, Ill.

[21] Appl. No.: 481,099

[22] Filed: Mar. 31, 1983

Related U.S. Application Data

[63] Continuation-in-part of Ser. No. 243,153, Mar. 12, 1981, abandoned.

[51] Int. Cl.$^4$ .................... C09K 3/00; C23F 11/04; C23F 11/18
[52] U.S. Cl. .................. 252/189; 252/8.55 E; 252/389 R; 422/16; 422/19
[58] Field of Search ............ 252/189, 389.53, 8.55 E; 422/16, 19

[56] References Cited

U.S. PATENT DOCUMENTS

| | | | |
|---|---|---|---|
| 3,033,784 | 5/1962 | Jones | 252/8.55 |
| 3,133,028 | 5/1964 | Channabasappa | 422/19 |
| 4,100,100 | 7/1978 | Clouse et al. | 252/189 |
| 4,431,563 | 2/1984 | Krawczyk et al. | 422/19 |

*Primary Examiner*—Christine M. Nucker
*Attorney, Agent, or Firm*—Scott H. Brown; Fred E. Hook

[57] ABSTRACT

A corrosion inhibitor composition useful for preventing corrosion by solvents used in treating sour gas streams, comprising a quaternary pyridine salt, a surface-active agent and/or a thio compound and an effective amount of a water soluble nickel compound. The composition can also contain a demulsifier to prevent foaming of the resultant solution.

10 Claims, 2 Drawing Figures

CORROSION INHIBITOR FOR AMINE GAS SWEETENING SYSTEMS

This is a continuation in part of application Ser. No. 243,153, filed 3/12/81, now abandoned.

BACKGROUND OF THE INVENTION

1. Field of the Invention

The present invention relates to an inhibitor composition and, more particularly, to such a composition useful for preventing corrosion by solvents used in treating sour gas streams.

2. Setting of the Invention

The conditioning of naturally occurring and synthetic gases by absorbing acidic gases, such as $CO_2$, $H_2S$, COS and HCN, in an absorbent solution has been practiced commercially for years. Aqueous solutions of various compounds such as alkanolamine, sulfolane (tetrahydrothiophene 1,1-dioxide), potassium carbonate and mixtures of two or more of these have been used for this purpose. Often, these systems are plagued by corrosion of metal equipment which can be caused by products of degradation of the absorbent, by acidic components, or by products of these acidic components with the absorbent. For example, although aqueous alkanolamine itself is not particularly corrosive toward iron and steel equipment, when dissolved $CO_2$ $H_2S$ are present, the solution is highly corrosive, particularly when the solution is hot.

To combat this problem, various metal compounds have been used alone or in combination with other compounds as corrosion inhibitors, e.g., compounds of arsenic, antimony and vanadium. While such metal compounds are effective corrosion inhibitors, they have the disadvantage of low solubility in most gas conditioning solutions and are of relatively high toxicity. This toxicity is particularly undesirable since it affects both the handling of the solvent and the disposal of the waste material.

One water-soluble composition for inhibiting corrosion by hydrogen sulfide, carbon dioxide and water soluble carboxylate acids comprises a quaternary ammonium compound of benzyl chloride and the residue boiling between about 200° C. and about 350° C. from the distillation of the acid extract of the reaction product of ammonia and acetaldehyde and a sufficient amount of a combination of surface-active agents to form a substantially clear solution when the composition is diluted with water. The surface-active combination contains about two parts of the reaction product of one mole of nonylphenol with from about 8 to 20 mole of ethylene oxide and about one part of reaction product of one mole of tridecyl alcohol with from about 30 to about 50 moles of ethylene oxide. This composition is described in U.S. Pat. No. 3,033,784 which issued on May 8, 1962 to L. W. Jones and is entitled "Water Soluble Corrosion Inhibitor and Bactericide", which is hereby incorporated by reference. Nowhere within Jones is it disclosed or suggested to use a nickel compound as a corrosion inhibitor.

Another sour gas inhibitor for $CO_2$ promoted corrosion of iron and steel is found in U.S. Pat. No. 4,100,100 which issued on July 11, 1978 to Robert C. Clouse et al and is entitled "Cobalt Inhibitor for Sour Gas Conditioning Solutions". The inhibitor composition of Clouse comprises one part by weight of quaternary pyridine salt, about 0.001 to about 10 parts of a thio compound which is water-soluble thiocyanate or an organic thioamide and a small but effective amount of cobalt, the cobalt being present as a dissolved divalent cobalt compound. Nowhere within Clouse is it disclosed or suggested to use a nickel compound as a corrosion inhibitor.

SUMMARY OF THE INVENTION

The present invention is for a new corrosion inhibiting composition contemplated to overcome the foregoing disadvantages. The composition comprises a water soluble quaternary pyridine salt, a surface active agent and/or a thio compound, and an effective amount of a water soluble nickel compound. The composition can also include a demulsifier in sufficient amount to prevent foaming of the solution.

DETAILED DESCRIPTION OF THE PREFERRED EMBODIMENTS

Figure 1:
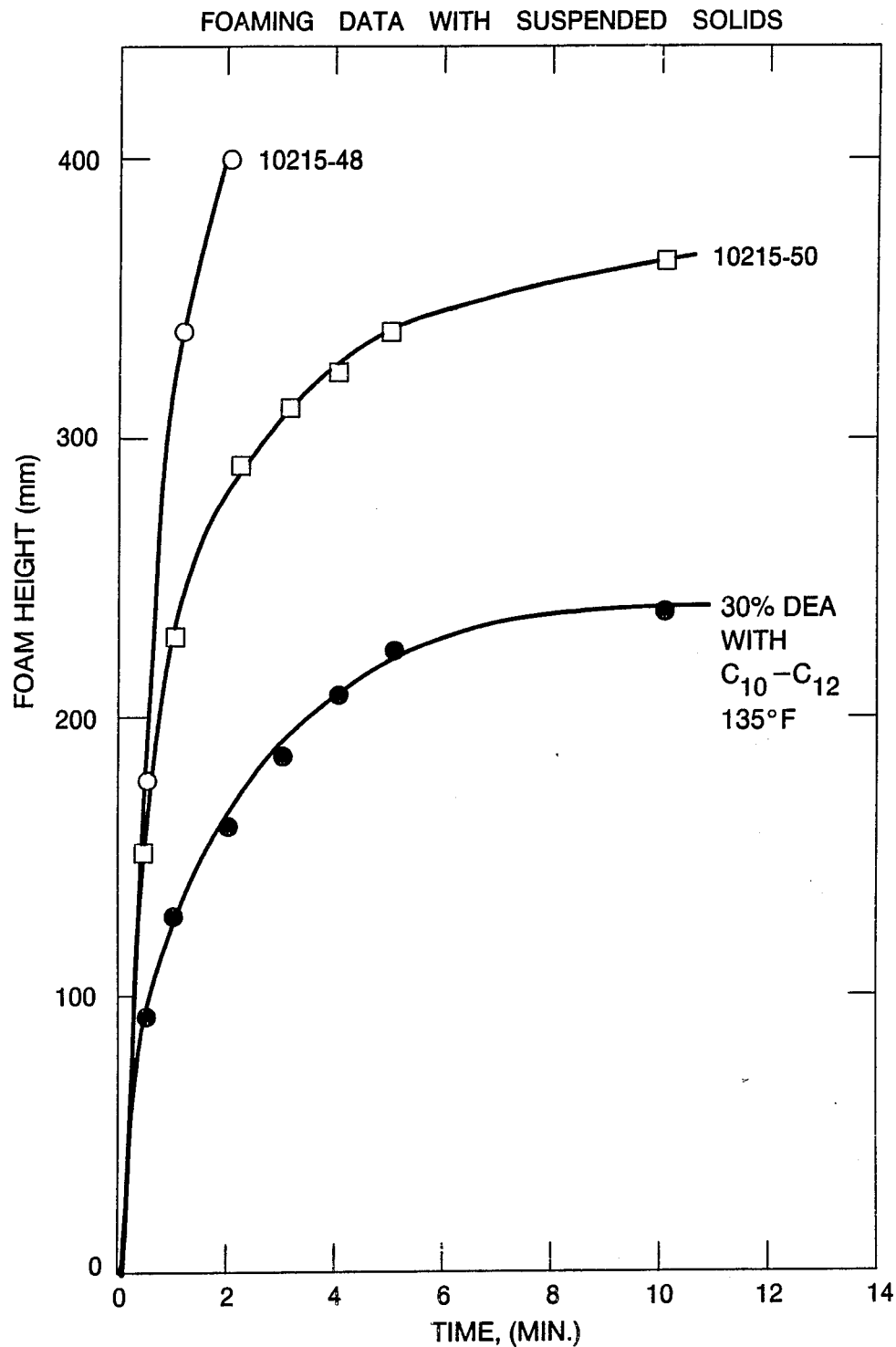
FIGS. 1 and 2 illustrate the test results of experiments designed to show the foam-inhibition of the present invention.

The present invention is a conditioning solution inhibited against $CO_2$ and $H_2S$ promoted corrosion of ferrous materials by having dissolved therein an inhibiting composition, comprising a water soluble quaternary pyridine salt, a surface active and/or a thio compound, and an effective amount of water soluble nickel compound.

The nickel compound used in the present invention can be any nickel compound which is sufficiently soluble in an aqueous alkanolamine solution to provide the desired concentration of nickel ions. Salts such as $NiCl_2$, $NiBr_2$, $NiSO_4$, $Ni(NO_3)_2$, nickel acetate and nickel benzoate are all suitable sources of nickel ions. Salts such as acetate, benzoate and bromide are particularly preferred. Most preferably, the salt is nickel acetate. Preferably such salts are added to the alkanolamine solution in a concentration to provide divalent nickel concentration ranging from about 10 to about 50 parts per million of solution.

In the quaternary salt-surfactant inhibitor composition, essentially any pyridinium salt which is stable in aqueous alkanolamine is operable or any mixture of salts thereof. Preferably, this salt has the formula:

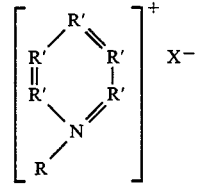

where R is an alkyl radical of 1 to about 20 carbon atoms, a benzyl radical or an alkylated benzyl radical wherein the aromatic ring has one or more alkyl substituents totaling 1 to about 20 carbon atoms, each R' can be a methylene group or an alkyl substituted methylene radical of about 1 to about 6 carbon atoms and X is an anionic radical, such as halide, sulfate, acetate or nitrate. In the above general formula, X is preferably a bromide or chlorine atom and most preferably bromine. Best results are also obtained when at least one R' represents an alkyl radical and particularly good inhibition has been found when the pyridine ring has multiple alkyl substitutes. Preferably R is a higher alkyl radical of about 10 to 18 carbon atoms.

Quaternary ammonium compounds can be prepared as disclosed in U.S. Pat. No. 3,033,784 and from mixed high boiling polyalkyl pyridines. The quaternaries are prepared by reacting the mixed polyalkyl pyridines with quaternizing agent preferably an alkyl or aryl halide such as methyl iodide, ethyl bromide, benzyl chloride, or the like. The resulting quaternary has a high tendency to form films on metal surfaces which provide good corrosion inhibiting action results. However, the combination of the quaternary ammonium compound and a surface-active agent is sometimes a viscous semisolid mass not easily usable in the field. This composition can be made less viscous by the addition of a solvent, such as methanol. This composition can also contain water to prehydrate the surface active agent and thus assist in solubilizing the quaternary ammonium compound. A representative composition is as follows:

|  | Percent by Wt. |
|---|---|
| Mixed polyalkyl pyridines quaternized with benzyl chloride | 30–50 |
| Nonyl phenol reacted with 10 moles of ethylene oxide | 5–15 |
| Tridecyl alcohol reacted with 40 moles of ethylene oxide | 2–12 |
| Isopropyl alcohol | 20–40 |
| Water | 5–20 |

The surface-active agent used in the present invention is designed to be capable of dispersing or solubilizing a quaternary of limited water solubility into the particular brine to such a degree that the solution is substantially clear. The unique film-forming action of the quaternary compound which performs the function of inhibiting corrosion depends on the quaternary being dispersed in a specific brine to such a degree that the solution is clear or nearly so. Since the degree of dispersion depends upon concentration of and the nature of the salt as well as the concentration of the surface-active agent and since waters vary widely in types and concentrations of salt present, it is apparent that the surface-active agents which give a very adequate degree of dispersion of quaternary compound in one brine may give a completely inadequate degree of dispersion in another brine. A typical dispersant is the reaction product of ethylene oxide and an aliphatic hydrocarbon of at least eight (8) carbon atoms.

The composition can contain, instead of or in addition to the surface-active agent, a thio compound which is preferably a water-soluble thiocyanate such as an alkali metal thiocyanate or most preferably ammonium thiocyanate. This thio compound can also be an organic thioamide which includes thiourea, a polythiourea, a hydrocarbon substituted derivative thereof, or a thioamide having the formula:

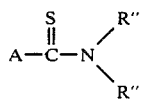

where A is the hydrocarbon radical of 1 to about 12 carbon atoms or a pyridyl radical and each R″ is a hydrogen atom or an alkyl radical of 1 to about 8 carbon atoms. Thioamides such as thiourea, 1,2-diethylthiourea, propylthiourea, 1,1-diphenylthiourea, thiocarbanilide, 1,2-dibutylthiourea, dithiobiurea, thioacetamide, thionicotinamide, and thiobenzamide are representative of this class. Soluble sulfide can cause undesired precipitation of the nickel compound.

While any significant quantity of the inhibitor composition of the present invention will provide some degree of inhibition of corrosion, at least about 2000 parts per million concentration of the three component combinations in the conditioning solution is desirable to provide protection; however, the nickel compound, the thio compound, the surface-active compound or the pyridine salt alone will provide little or no corrosion inhibition. Very little of the nickel compound is usually needed in the pyridine salt combination; specifically, concentrations as low as about 5 parts per million by weight of solution of the nickel compound in the presence of about 100 to about 2000 parts by weight of pyridine salt-surface-active agent per million of solution have been found to give effective inhibition. A very high degree of inhibition with the particular combination is found with a concentration of the nickel compound between about 35 and about 50 parts per million based on weight of the solution. Higher concentrations of this nickel compound appear to offer little or no added benefit under most conditions and can cause deterioration of the effects of the inhibitor combination when used at much higher concentration.

It has been found that at least about 50 parts per million and preferably about 100 to about 2000 parts of inhibiting composition per million of solution is desired to obtain the desired results. A very high degree of inhibition occurs at a particular level within the preferred range described above, and higher concentrations of either component or of the combined components provide slight added protection, if any. In many cases, higher concentrations seem to cause a slight decline in the degree of inhibition after a maximum has been reached.

In certain situations the composition of this invention may foam when added to amine systems. To inhibit such foaming an emulsion breaker can be added to the composition without a perceptible decrease in corrosion inhibitions performance. Such an emulsion breaker can be OX-11, OX-41 and preferably OX-45, marketed by Amoco Oil Company. The emulsion breaker can be a reaction product of ethylene oxide and/or propylene oxide with a glycol compound of at least about 2000 molecular weight, such as a polypropylene glycol or a polyethylene glycol. A representative compound is as follows:

|  | Wt % |
|---|---|
| Ethylene oxide | 20–50 |
| Propylene Oxide | 6–20 |
| Glycol | 30–74 |

TESTING PROCEDURE

The corrosion of mild steel by aqueous alkyolamine solutions saturated with $CO_2$ and $H_2S$ for 7 hours at 10°–20° C. was measured at elevated temperatures and moderate pressure. Loosely capped bottles each containing 120 ml of test solution and a totally immersed $1 \times 2.5 \times 0.0625$ inch coupon of 1020 mild steel were put in a modified pressure filter for a period of 16–18 hours, at a boiling point of 215° to 220° F. under reflux conditions for the liquid phase test. Another coupon was also exposed to the vapor of each test solution at the above conditions. The test solution consisted of 25% monoethanolamine, 5% hydroxyethylethylene-diamine and 70% water saturated at atmospheric pressure with a gas mixture of 15% $H_2S$ and 85% $CO_2$. The steel coupons were previously cleaned with 5N HCl by immersion for 30 seconds at room temperature followed by a soap and water wash, a water rinse, then an acetone rinse and air drying. At least two bottles of each trial solution were tested in each experiment along with three bottles of solution containing no inhibitor which served as controls. After testing, the same cleaning procedure was used except that the HCl treatment was 15 minutes with 5N HCl inhibited with Dowell A-120, a commercial inhibitor (Dowell Division, The Dow Chemical Company), in order to remove any corrosion deposits. The efficiency of inhibition was calculated according to the following formulas using the average weight loss of the test coupons:

$$\% \text{ Inhibition} = \frac{\text{Corrosion rate of blanks} - \text{rate of test coupons}}{\text{corrosion rate of blanks}} \times 100$$

PREPARATION OF QUATERNARY SALTS

The quaternary pyridinium salts used in the inhibitor compositions were made by heating a mixture of the pyridine compound with excess alkyl halide or benzyl halide at 90° C. for 2 hours. The reaction mixture was then cooled and the quaternary salt was recovered as a solid or viscous liquid precipitate.

EXAMPLE 1

The alkylpyridinium quaternary salt used in these tests was the reaction product of dodecylbenzyl chloride and high boiling alkylpyridine still bottoms (HAP) sold by Amoco Chemical Company as Wellaid 840 which contains surfactant solubilizers, $H_2O$ and alcohol. These still bottoms were from processes for making various lower alkylpyridines wherein most of the components were pyridines having multiple lower alkyl substituents, particularly methyl and ethyl groups.

The organic part of the inhibitor combination was added in a concentration of 2000 ppm of solution. Cobalt acetate was added to the inhibition system in various concentrations.

TABLE I

| Cobalt Acetate Concentration ppm | Liquid Phase % Inhibition | Vapor Phase % Inhibition |
|---|---|---|
| 0 | 66.8 | 20.8 |
| 50 | 71.8 | 27.0 |
| 100 | 79.0 | 32.0 |

EXAMPLE 2

The procedure of Example 1 was repeated using nickel acetate as is shown in Table II.

TABLE II

| Nickel Acetate Concentration ppm | Liquid Phase % Inhibition | Vapor Phase % Inhibition |
|---|---|---|
| 0 | 66 | 20.8 |

TABLE II-continued

| Nickel Acetate Concentration ppm | Liquid Phase % Inhibition | Vapor Phase % Inhibition |
|---|---|---|
| 10 | 78.8 | 49.1 |
| 25 | 84.0 | 67 |
| 35 | 71.7 | 64.8 |
| 50 | 66.7 | 72.3 |
| 100 | 12.2 | 81.4 |

EXAMPLE 3

Conditions: Utilizing stirred and refluxed glass test cells containing 1800 ml of alkanolamine solution test solutions were formulated with 20-60% diethanalamine with the remainder water. The inhibitor concentration was 2000 ppm and 35 ppm nickel acetate. The temperature during the test was 225° F. and the test duration was for 24 hours. The solution was loaded with carbon dioxide only at various mol ratios of 15/DEA. The test utilized the same coupon preparation and evaluation procedures as before; however, no phase phase coupon was used.

TABLE III

| $CO_2$ Concentration (mol/p DEA soln.) | Liquid Phase % Inhibition |
|---|---|
| 0.6 | 90.9 |
| 0.9 | 93.1 |
| 1.5 | 93.4 |
| 1.9 | 89.7 |

FOAMING TEST PROCEDURE

Foaming tests were conducted in a 40 mm diameter by 550 mm long burette column fitted with a fritted disk at the bottom. The column was surrounded by a water jacket piped to a constant temperature both to control test temperature. Nitrogen was used as the purge gas in all tests and was admitted to the column through a stopcock in the bottom below the fritted disk. Flow rate in all tests was 2 CFH.

The basic test solution consisted of 250 ml of 30%$_w$ in water. In all tests reported, a 5%$_v$ hydrocarbon phase consisting of a $C_{10}$-$C_{12}$ distillation cut was also added to the amine solution. The selection of this particular hydrocarbon was based on earlier work that indicated it particularly promoted foaming in amine solutions. Tests were run with and without suspended solids in the solution. For tests using solids, 1 ml of a 10% Nickel acetate solution was added to the amine solution, followed by a short (1-2 min) purge of the solution with $H_2S$. In this manner, the sulfide solids formed were finely dispersed with a very small particle size similar to that seen in actual practice. Corrosion inhibitors were then added to the solution in concentrations of 1000 ppm in each test.

After reaching thermal equilibrium, the nitrogen purge was started. Foam height was recorded as the difference between the top of foam in the column and the original liquid level. Test duration was generally 10-15 min, at which time most solutions stabilized.

| | Experimental Inhibitor Formulas Parts by Weight | | | |
|---|---|---|---|---|
| | Expr B | 10215-38 | 10215-48 | 10215-50 |
| QUAT 4 | 21.6 | 40.0 (4) | 40.0 (4) | 40.0 (4) |
| IPA | 26.0 | 30.0 (3) | 30.0 (3) | 30.0 (3) |
| OX-11 | 0 | 0.3 (2) | 0.33 (2) | 0.33 (2) |

-continued

| | Experimental Inhibitor Formulas Parts by Weight | | | |
|---|---|---|---|---|
| | Expr B | 10215-38 | 10215-48 | 10215-50 |
| OX-41 | 0 | 0.67 (1) | 0.67 (1) | 0.67 (1) |
| OX-45 | 0 | 0 | 1.00 (5) | 0.50 (5) |
| Isooctyl Al. | 9.1 | 0 | 0 | 0 |
| $H_2O$ | 43.3 | 29.0 (5) | 28 (6) | 28.5 (6) |

Figure 2:
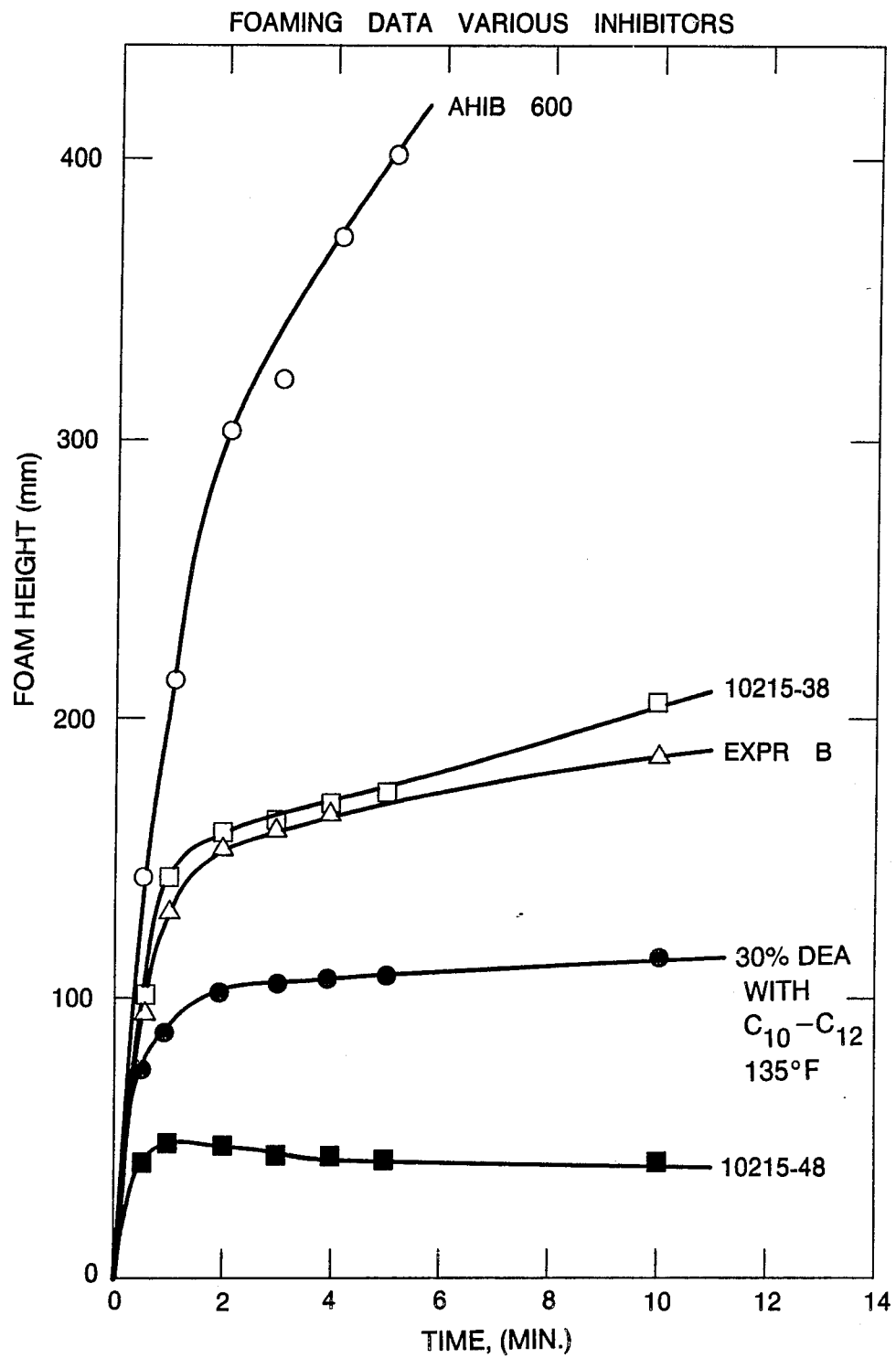

The results of these foaming tests are shown in FIGS. 1 and 2 and illustrate the excellent foam breaking characteristics of the present invention.

Whereas, the present invention has been described in particular relation to the textural material contained herein, it should be understood that other and further modifications, apart from those shown or suggested herein, may be made within the scope and spirit of this invention.

We claim:

1. An inhibiting composition, comprising a water soluble quaternary pyridine salt, a sufficient amount of a surface-active agent, and an effective amount of a water soluble nickel compound.

2. A conditioning solution inhibited against $CO_2$ and $H_2S$ promoted corrosion of ferrous materials by having dissolved therein an inhibiting composition, comprising a quanternary ammonium compound of benzyl chloride and the residue boiling between 200° C. and about 350° C. from the distillation of an acid extract of the reaction product of ammonia and acetaldehyde, a sufficient amount of a surface-active agent, and an effective amount of a water soluble nickel compound.

3. The solution of claim 1 or 2 and including a thio compound.

4. The solution of claim 1 or 2 and including a demulsifier in sufficient amount to prevent foaming of the solution.

5. The solution of claim 4 wherein said demulsifier is a reaction product of ethylene oxide and/or propylene oxide with a glycol compound of at least about 2000 molecular weight.

6. The solution of claim 1 or 2 wherein the nickel compound is present in a concentration of about 5 to about 100 parts per million based upon the weight of the solution of said water soluble nickel compound.

7. The composition of claim 1 wherein said surface active agent comprises about 2 parts of the reaction product of a 1 mole monyl phenol with from about 8 to about 20 moles of ethylene oxide and about 1 parts of a reaction product of 1 mole of tridecyl alcohol with from about 30 to about 50 moles of ethylene oxide.

8. The solution of claims 1 or 2 wherein said conditioning solution contains at least 50 parts of inhibiting composition per million based on the weight of solution.

9. The composition of claim 1 wherein the ratio of surface active agent of pyridine salt ranges from 0.001:1 to about 10:1.

10. The solution of claim 5 wherein the ratio of thio compound to pyridine salt ranges from about 0.001:1 to about 10:1.

* * * * *